(12) United States Patent
Sprinkle

(10) Patent No.: US 8,850,371 B2
(45) Date of Patent: Sep. 30, 2014

(54) ENHANCED CLOCK GATING IN RETIMED MODULES

(75) Inventor: Colin Pearse Sprinkle, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/620,040

(22) Filed: Sep. 14, 2012

(65) Prior Publication Data

US 2014/0082400 A1     Mar. 20, 2014

(51) Int. Cl.
*G06F 17/50*          (2006.01)
*G06F 9/45*           (2006.01)

(52) U.S. Cl.
USPC ............................ 716/103; 716/100; 716/101

(58) Field of Classification Search
CPC ............ G06F 17/5045; G06F 17/5022; G06F 17/505; G06F 17/504; G06F 17/5068; G06F 17/5036
USPC ......................................... 716/100, 101, 103
See application file for complete search history.

(56) References Cited

U.S. PATENT DOCUMENTS

| | | | |
|---|---|---|---|
| 5,643,086 A | 7/1997 | Alcorn et al. | |
| 5,752,062 A | 5/1998 | Gover et al. | |
| 5,757,919 A | 5/1998 | Herbert et al. | |
| 5,815,154 A | 9/1998 | Hirschtick et al. | |
| 5,892,904 A | 4/1999 | Atkinson et al. | |
| 5,920,725 A | 7/1999 | Ma et al. | |
| 5,970,147 A | 10/1999 | Davis | |
| 5,978,484 A | 11/1999 | Apperson et al. | |
| 5,999,737 A | 12/1999 | Srivastava | |
| 6,016,474 A | 1/2000 | Kim et al. | |
| 6,157,618 A | 12/2000 | Boss et al. | |
| 6,266,416 B1 | 7/2001 | Sigbjoernsen et al. | |
| 6,330,008 B1 | 12/2001 | Razdow et al. | |
| 6,362,825 B1 | 3/2002 | Johnson | |
| 6,412,039 B1 | 6/2002 | Chang | |
| 6,668,325 B1 | 12/2003 | Collberg et al. | |
| 6,684,389 B1 | 1/2004 | Tanaka et al. | |
| 6,732,060 B1 | 5/2004 | Lee | |
| 6,901,582 B1 | 5/2005 | Harrison | |

(Continued)

OTHER PUBLICATIONS

A Relational Debugging Engine for the Graphics Pipeline, Duca et al., http://citeseer.ist.psu.edu/cache/papers/cs2/167/http:zSZzSzwww.cs.jhu.eduzSz-cohensSzPublicationszSzgldb. pdf/a-relational-debugging-engine.pdf International Conference on Computer Graphics and Interactive Techniques, ACM SIGGRAPH 2005, pp. 453-463, LA, ISSN: 0730-0301.

(Continued)

*Primary Examiner* — Stacy Whitmore
*Assistant Examiner* — Magid Dimyan

(57) ABSTRACT

Embodiments of the invention may include receiving a design netlist representing a datapath operable to execute a function corresponding to an opcode combination. The datapath may include an input stage, a register stage, and an output stage and the register stage may include a plurality of registers. For a first function corresponding to a first opcode combination, a subset of unused registers in the plurality of registers may be automatically determined. Further, clock gating logic may be automatically inserted into the design netlist, wherein the clock gating logic is operable to dynamically clock gate the subset of unused registers contemporaneously when the datapath executes the first function corresponding to the first opcode combination.

20 Claims, 9 Drawing Sheets

(56) References Cited

U.S. PATENT DOCUMENTS

| | | |
|---|---|---|
| 6,943,800 B2 | 9/2005 | Taylor et al. |
| 6,965,994 B1 | 11/2005 | Brownell et al. |
| 7,016,972 B2 | 3/2006 | Bertram et al. |
| 7,047,519 B2 | 5/2006 | Bates et al. |
| 7,095,416 B1 | 8/2006 | Johns et al. |
| 7,107,484 B2 | 9/2006 | Yamazaki et al. |
| 7,173,635 B2 | 2/2007 | Amann et al. |
| 7,237,151 B2 | 6/2007 | Swoboda et al. |
| 7,260,066 B2 | 8/2007 | Wang et al. |
| 7,277,826 B2 | 10/2007 | Castelli et al. |
| 7,383,205 B1 | 6/2008 | Peinado et al. |
| 7,395,426 B2 | 7/2008 | Lee et al. |
| 7,401,116 B1 | 7/2008 | Chalfin et al. |
| 7,401,242 B2 | 7/2008 | Abernathy et al. |
| 7,420,563 B2 | 9/2008 | Wakabayashi |
| 7,505,953 B2 | 3/2009 | Doshi |
| 7,555,499 B2 | 6/2009 | Shah et al. |
| 7,765,500 B2 | 7/2010 | Hakura et al. |
| 7,778,800 B2 | 8/2010 | Aguaviva et al. |
| 7,891,012 B1 | 2/2011 | Kiel et al. |
| 8,108,810 B2 * | 1/2012 | Hoe et al. ............ 716/103 |
| 8,448,002 B2 | 5/2013 | Bulusu et al. |
| 2001/0034835 A1 | 10/2001 | Smith |
| 2001/0044928 A1 | 11/2001 | Akaike et al. |
| 2002/0133784 A1 * | 9/2002 | Gupta et al. ............ 716/1 |
| 2002/0157086 A1 | 10/2002 | Lewis et al. |
| 2002/0175839 A1 | 11/2002 | Frey |
| 2003/0043022 A1 | 3/2003 | Burgan et al. |
| 2003/0120935 A1 | 6/2003 | Teal et al. |
| 2003/0208723 A1 * | 11/2003 | Killian et al. ............ 716/1 |
| 2003/0214660 A1 | 11/2003 | Plass et al. |
| 2004/0085894 A1 | 5/2004 | Wang et al. |
| 2004/0130552 A1 | 7/2004 | Duluk, Jr. et al. |
| 2004/0158806 A1 * | 8/2004 | Scheffer ............ 716/11 |
| 2004/0158824 A1 | 8/2004 | Gennip et al. |
| 2004/0162989 A1 | 8/2004 | Kirovski |
| 2005/0198051 A1 | 9/2005 | Marr et al. |
| 2005/0222881 A1 | 10/2005 | Booker |
| 2005/0243094 A1 | 11/2005 | Patel et al. |
| 2005/0273652 A1 | 12/2005 | Okawa et al. |
| 2005/0278684 A1 | 12/2005 | Hamilton et al. |
| 2006/0047958 A1 | 3/2006 | Morais |
| 2006/0079333 A1 | 4/2006 | Morrow et al. |
| 2006/0080625 A1 | 4/2006 | Bose et al. |
| 2006/0109846 A1 | 5/2006 | Lioy et al. |
| 2006/0161761 A1 | 7/2006 | Schwartz et al. |
| 2006/0185017 A1 | 8/2006 | Challener et al. |
| 2007/0115292 A1 | 5/2007 | Brothers et al. |
| 2007/0274284 A1 | 11/2007 | Dendukuri et al. |
| 2008/0007563 A1 | 1/2008 | Aronson et al. |
| 2008/0095090 A1 | 4/2008 | Lee et al. |

OTHER PUBLICATIONS

"maxVUE Graphic Editor", Metso Automation, 2005, pp. 1-6, http://www.metsoautomation.com/automation/indes.nsf/Fr?Readform&ATL=automation/ed_prod.nsf/WebWID/WTB-041110-22256F-2445A; eHB.

"ATI Radeon X800, 3D Architecture White Paper", ATI, 2005, pp. 1-13, with proof of seniority (4 pages), according to ACM bibliography regarding the document: "The Direct3D 10 system", ACM TOG, vol. 25, Iss.3 (Jul. 2006), Reference 1; eHG.

N. Tatarchuk, "New RenderMonkey Features for DirectX and OpenGL Shader Development", Game Developers Conference, Mar. 2004.

C. Cebenoyan and M. Wloka, "Optimizing the Graphics Pipeline", 2003, Nvidia GDC Presentation Slide.

gDEBugger, graphicREMEDY, http://www.gremedy.com/ Jul. 29, 2005.

gDEBugger, graphicREMEDY, http://www.gremedy.com/ Aug. 8, 2006.

Josh Lessard, "Profiling Concurrent Programs Using Hardware Counters", May 2005, University of Waterloo, Thesis.

Dror G. Feitelson and Larry Rudolph, "Toward Convergence in a Job Scheduling for Parallel Supercomputers", Aug. 1996, Springer, Job Scheduling Strategies for Parallel Proceedings: IPPS '96 workshop Honolulu, Hawaii, Apr. 16, 1996 proceedings.

Jeffrey K. Hollingsworth and Barton P. Miller, "Dynamic Control of Performance Monitoring on Large Scale Parallel System", Jul. 23, 1993, ACM, "International Conference on Supercomputing" Proceedings of the 7th International Conference on Supercomputing, pp. 185-194.

gDEBugger, graphicREMEDY, http://www.gremedy.com Jul. 29, 2005.

* cited by examiner

| Opcode | Stage 410 | Stage 420 | Stage 430 |
|---|---|---|---|
| 0000 | Registers 411, 413 | Register 421 | Register 433 |
| 0001 | None | None | None |
| 0010 | Registers 412 | None | Register 431 |
| 0011 | Registers 411, 413 | Register 421 | Register 433 |
| 0100 | Registers 411, 413 | None | Register 431, 433 |
| 0101 | Registers 411, 413 | Register 421 | Register 433 |
| 0110 | None | Register 422 | None |
| 0111 | Register 412 | None | Register 431 |

FIG. 5B

| Opcode | Group | Stage 410 | Stage 420 | Stage 430 |
|---|---|---|---|---|
| 0000 | A | Registers 411, 413 | Register 421 | Register 433 |
| 0001 |   | None | None | None |
| 0010 | B | Register 412 | None | Register 431 |
| 0011 | A | Registers 411, 413 | Register 421 | Register 433 |
| 0100 |   | Registers 411, 413 | None | Register 431, 433 |
| 0101 | A | Registers 411, 413 | Register 421 | Register 433 |
| 0110 |   | None | Register 422 | None |
| 0111 | B | Register 412 | None | Register 431 |

ENHANCED CLOCK GATING IN RETIMED MODULES

BACKGROUND OF THE INVENTION

The synthesis of register transfer level (RTL) based design is a process of translating hardware descriptive language (HDL) coded design to logic gates based on library technology provided and given timing constraints. In order for a design to be synthesized to the logic gates, timing constraints may be imposed onto the input and output pins. Based on the timing constraints of the input and output pins, the logic gates may be established based on the HDL-coded design to meet these timing constraints. This achieves the required speed of operation and logic functionality using the logic gate library technology provided.

An RTL based design may be register retimed during synthesis in order to meet timing constraints, and as a result, additional circuitry like flip flops may be added to a design that are unnecessary for certain functional modes of the design. Meanwhile, current designs are increasingly complex with demands to incorporate more functionality with smaller areas and lower power consumption. However, conventional approaches of synthesizing designs are limited when attempting to achieve a required speed of operation and logic functionality while lowering power consumption of integrated circuit innovations.

BRIEF SUMMARY OF THE INVENTION

Accordingly, embodiments of the invention provide methods and systems for determining which registers in a retimed design are unnecessary for certain operations. Further, embodiments of the invention provide methods and systems for inserting clock gating circuitry into a retimed design to clock gate unnecessary registers when certain operations are being executed.

Embodiments of the invention may include receiving a design netlist representing a datapath operable to execute a function corresponding to an opcode combination. The datapath may include an input stage, a register stage, and an output stage and the register stage may include a plurality of registers. For a first function corresponding to a first opcode combination, a subset of unused registers in the plurality of registers may be automatically determined. Further, clock gating logic may be automatically inserted into the design netlist, wherein the clock gating logic is operable to dynamically clock gate the subset of unused registers contemporaneously when the datapath executes the first function corresponding to the first opcode combination.

Embodiments of the invention may include receiving input data and an opcode combination at an input stage of a datapath. The datapath may include a plurality of register stages and an output stage and each of the plurality of register stages may include a plurality of registers. A plurality of unused registers in at least one of the plurality of register stages may be clock gated based on the opcode combination. In addition, output data may be provided at the output stage based on the input data and the opcode combination.

Embodiments of the invention may be directed to a computer system. More specifically, the computer system may include a processor and memory coupled to the processor and having stored therein instructions that, if executed by the computer system, cause the computer system to execute operations. The operations may include receiving a design netlist representing a datapath operable to execute a function corresponding to an opcode combination. The datapath may include an input stage, a register stage, and an output stage and the register stage may include a plurality of registers. For a first function corresponding to a first opcode combination, a subset of unused registers in the plurality of registers may be automatically determined. Further, clock gating logic may be automatically inserted into the design netlist, wherein the clock gating logic is operable to dynamically clock gate the subset of unused registers contemporaneously when the datapath executes the first function corresponding to the first opcode combination The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 5B-5C depict tables of opcodes and corresponding unnecessary registers to be clock gated, according to an embodiment of the present invention.

DETAILED DESCRIPTION OF THE INVENTION

Figure 1:
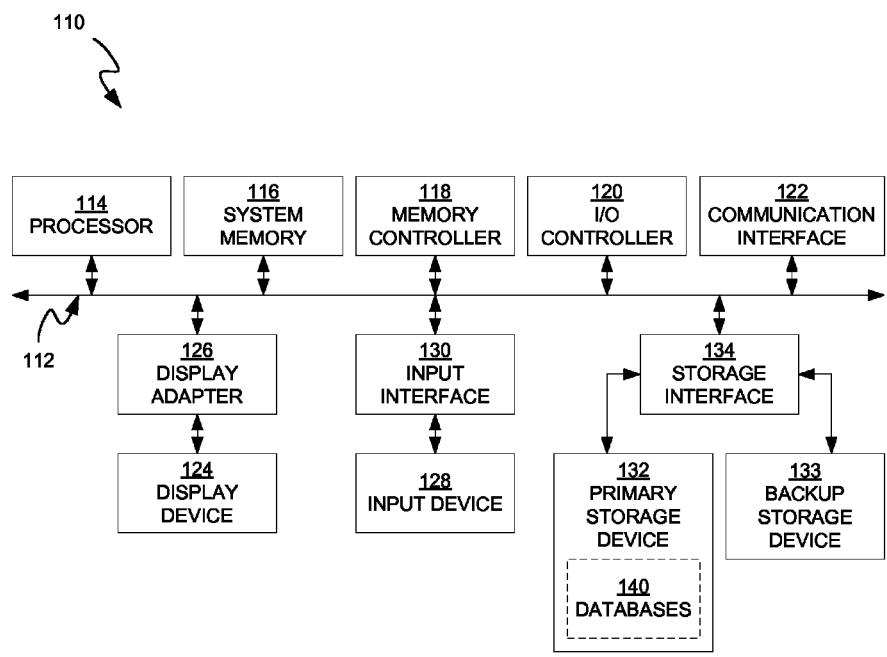
FIG. 1 is a block diagram of an example of a computing system capable of implementing embodiments of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "clock gating," "determining," "identifying," "receiving," "inserting," "propagating," "analyzing," "grouping," or the like, refer to actions and processes (e.g., flowchart 700 of FIG. 7) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for determining unnecessary registers for certain functions in a design and inserting logic to clock gate such registers during the execution of such functions may be stored on the computer-readable medium and then stored in system memory 116 and/or various portions of storage devices 132 and 133. When executed by the processor 114, the computer program may cause the processor 114 to perform and/or be a means for performing the functions required for carrying out the determining and inserting processes discussed above.

Enhanced Clock Gating in Retimed Modules

Embodiments of the present invention provide methods and systems for decreasing power consumption of datapaths, for example, a datapath in an arithmetic logic unit. However, embodiments of the present invention can be applied to any logic design.

Because datapaths may be very highly replicated in integrated circuit designs, it may be advantageous to save power in a datapath design that may be implemented very frequently. Inside datapaths themselves, a substantial amount of power is attributed to clock tree power and power consumed by flip-flops, latches, or registers. Embodiments of the invention allow for substantially reducing power consumption in datapaths while maintaining performance and adding minimal area to a design. Logic that may be added may be essentially on a clock path, thereby avoiding impact to design operating frequency.

Embodiments of the invention allow for dynamic clock gating of flip-flops, latches, or registers to reduce power consumption when such components are unnecessary for the successful operation of certain functions of a datapath. For example, over 30% of the flops in a datapath may be gated for over 80% of all clock cycles. Accordingly, such gating of flops may save an average of 10% or more total power in a datapath for real world applications.

Conventionally, clock gating may be inserted in a design at the Register-Transfer Level (RTL) stage. For complex datapaths, such a task may be very time-consuming. Further, it may be impossible for a designer to beat timing and area results that may be obtained from using a register retiming process. In addition, it may be impossible for a designer to optimally gate registers in the RTL stage because such registers may not exist at the RTL stage.

However, for RTL which is retimed during synthesis, a designer may lose control of exactly how flops are created in a netlist. Therefore, a designer may not enhance the clock gating of retimed registers from the RTL level because those registers do not exist at the RTL level. A skilled designer may beat timing and area by retiming registers at the RTL level instead of automatic retiming during synthesis. However, such a process may be extremely time-consuming, difficult, and may often require months of effort for even the simplest of datapaths.

Figure 2:
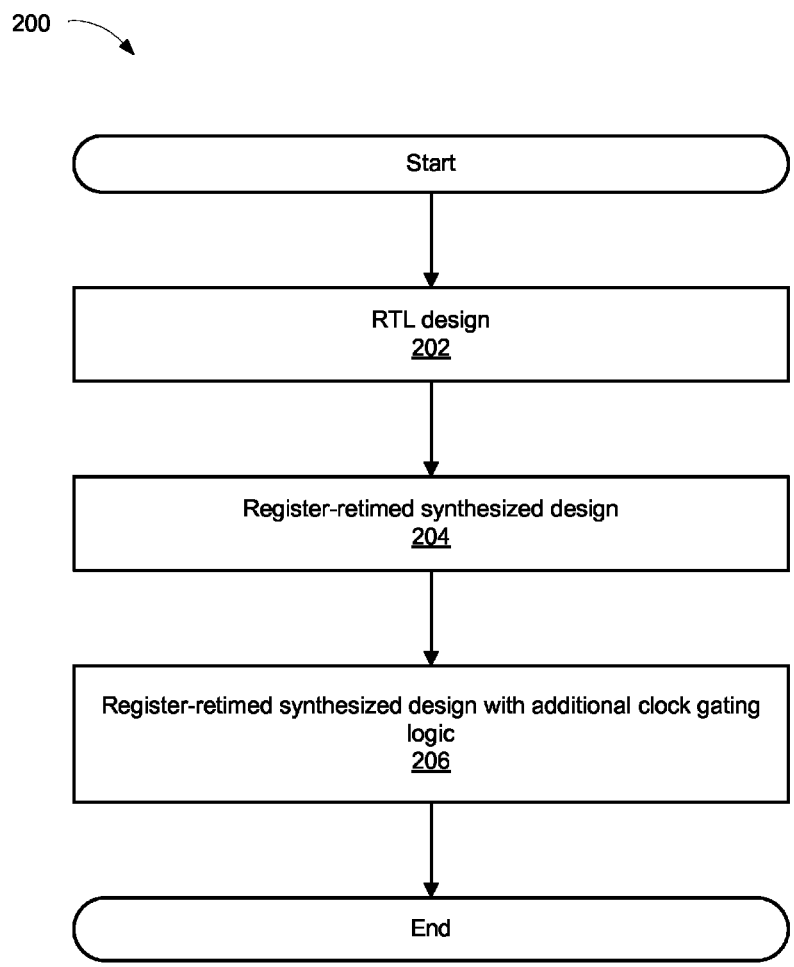
FIG. 2 depicts a flowchart of an exemplary process of developing a logic design, according to an embodiment of the present invention.

FIG. 2 depicts a flowchart 200 of an exemplary process of developing a logic design, according to an embodiment of the present invention. At a block 202, a logic design may be designed at the RTL level. For example, a datapath that is operable to perform mathematical functions may be represented by an RTL design. At a block 204, the RTL design may be synthesized into a logic gate representation of the design and further register retimed to satisfy timing constraints. At a block 206, the retimed design may be inserted with additional clock gating logic. For example, after the datapath is synthesized and register retimed, registers that are unnecessary for certain operations may be determined. In addition, logic to clock gate such unnecessary registers may be inserted to disable such registers from operating during such operations.

Figure 3:
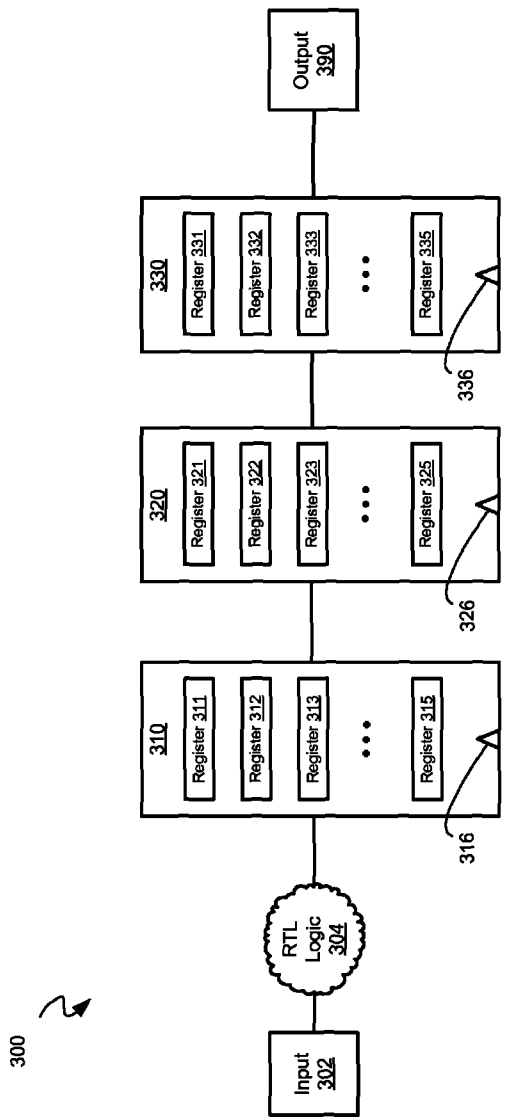
FIG. 3 is a block diagram of an exemplary RTL design, according to an embodiment of the present invention.

FIG. 3 is a block diagram of an exemplary RTL design 300, according to an embodiment of the present invention. Generally, RTL is a design abstraction that models a circuit in terms of the flow of digital signals or data between hardware registers and the logical operations performed on those signals or data. RTL design abstractions are used in hardware description languages like VHDL and Verilog to create high-level representations of a circuit, from which lower-level representations and ultimately actual wiring can be established.

RTL design 300 represents a datapath. A datapath may include units, such as arithmetic logic units or multipliers, which may be used to perform mathematical operations on data. A single datapath may perform a variety of instructions or operations, including addition, multiplication, fused multiplication-addition, comparing, etc. Also, datapaths may have different modes of operation. For example, a datapath may perform operations on 16-bit integer, 32-bit floating point, or 64-bit floating point operands, depending on the instruction for any given clock cycle.

RTL design 300 includes RTL logic 304 that may execute logical operations on data provided by an input 302. RTL logic 304 may be coupled with at least one stage of flops, latches, and/or registers. For example, the register stages 310, 320, and 330 may follow RTL logic 304 in the datapath. It should be appreciated that flops, flip-flops, latches, and registers are referred to interchangeably herein. The register stages 310, 320, and 330 may be clocked by the clock inputs 316, 326, and 336, respectively. As a result, the RTL design 300 may simulate a pipelined architecture.

Each of the register stages 310, 320, and 330 may include one or more registers. For example, the register stage 310 may include the registers 311, 312, 313, and 315. If the RTL design 300 includes a 32-bit datapath, then each register stage may include 32 registers. If the RTL design 300 includes a 64-bit datapath, then each register stage may include 64 registers, and so on. The RTL design 300 may include an output 390 following the RTL logic 304 and the register stages 310, 320, and 330.

Because of the complexity of such units and because fast clock rates may be used, it may be preferable to retime datapaths during synthesis in order to meet timing constraints and minimize the area occupied by the resulting circuitry. In other words, a datapath may be designed as a cloud or cluster of logic, followed by a series of registers or registers at the end of the logic, as illustrated by the RTL design 300.

Figure 4:
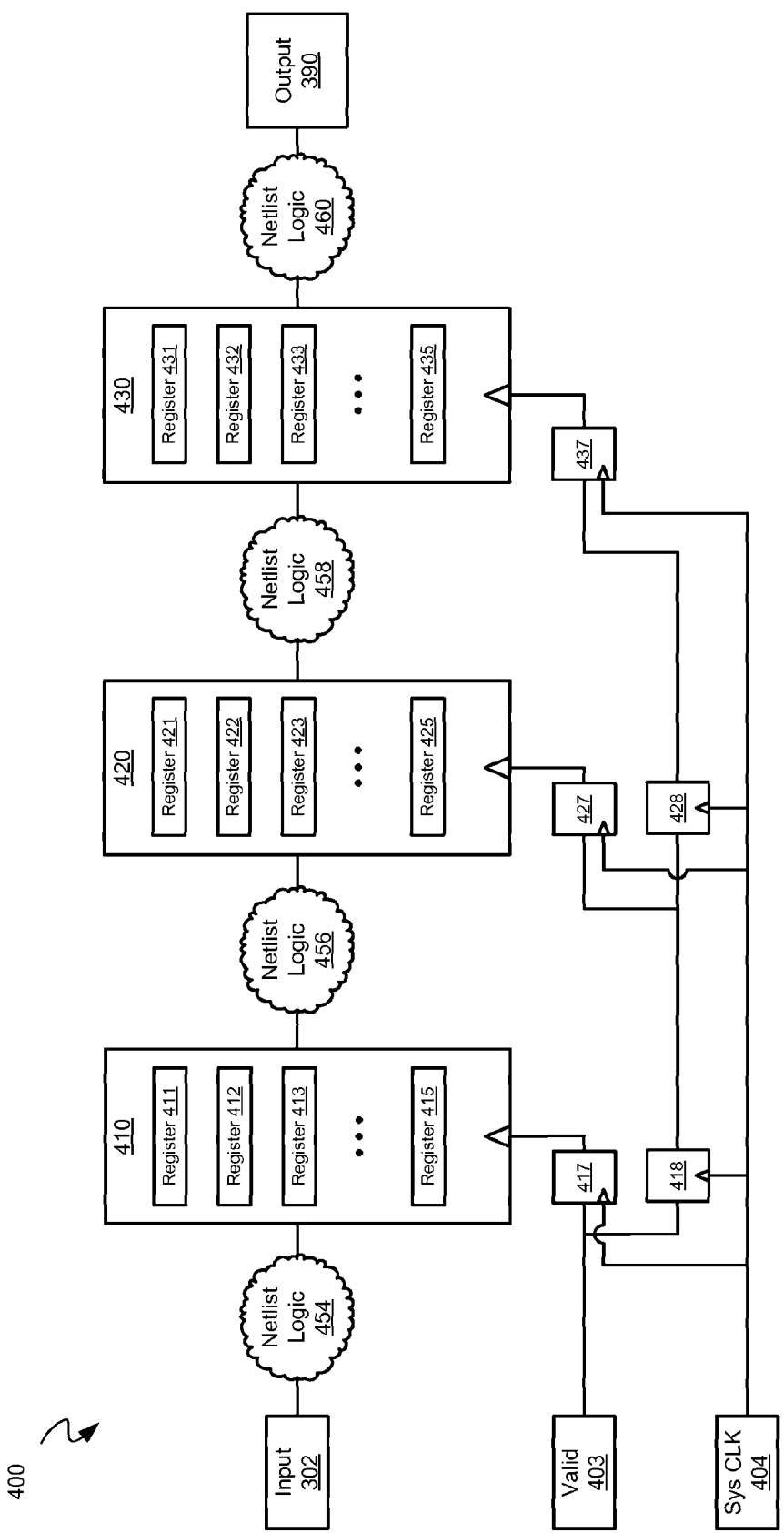
FIG. 4 is a block diagram of an exemplary synthesized netlist design, according to an embodiment of the present invention.

FIG. 4 is a block diagram of an exemplary synthesized netlist design 400, according to an embodiment of the present invention. A logic synthesis tool may synthesize an RTL design to create a logic gate level representation of the design in the form of a netlist. A netlist may describe the connectivity of the logic gates and registers.

During a register-retiming process in the course of logic synthesis, a logic synthesis tool may arrange the registers and register stages of an RTL design throughout the design. As a result, instead of including registers at the end of the design, there may be many registers inserted throughout the cloud of logic corresponding to RTL logic 304 in order to meet timing constraints. Due to this process, there may be many more, even an order of magnitude more, registers in the netlist implementation of the design than there are in the actual RTL implementation of the design.

For example, netlist design 400 is logically equivalent to RTL design 300 in that the data at an output 390 of FIG. 4 may be identical to the data at the output 390 of FIG. 3 for the same data values provided by input 302, respectively. However, the implementation of the rest of the datapath in the netlist design 400 may differ from the RTL design 300. For example, there may be one or more register stages inserted between netlist logic 454, 456, 458, and 460.

The register stages 410, 420, and 430 may not necessarily be equivalent to register stages 310, 320, and 330 of FIG. 3. As discussed above, there may be many more registers in the netlist implementation of the design than there are in the actual RTL implementation of the design. For example, while register stages 310, 320, and 330 of FIG. 3 may each include 32 registers for a 32-bit datapath, register stage 410 may include 200 registers, register stage 420 may include 500 registers, and register stage 430 may include 100 registers.

Figure 5A:
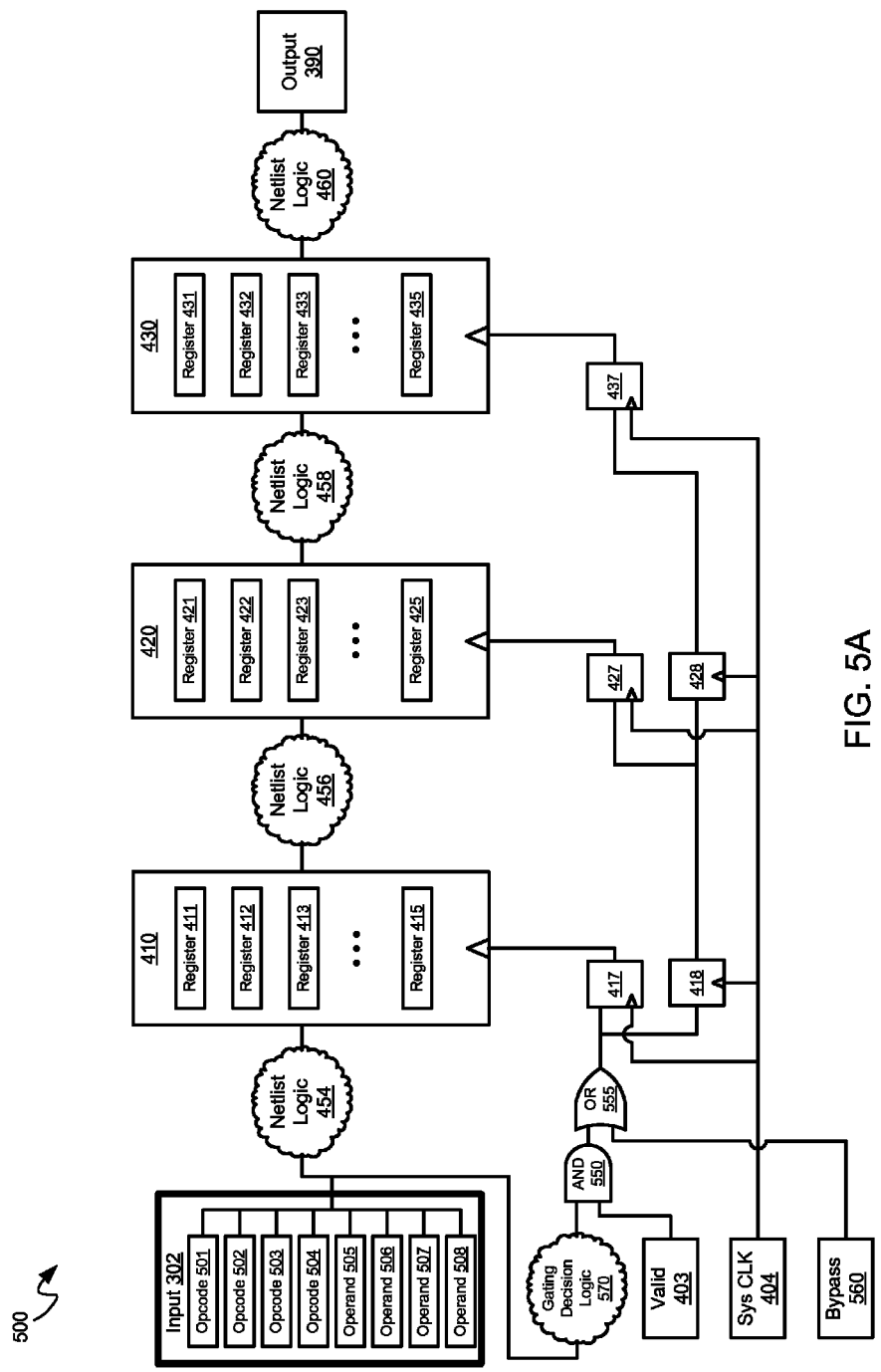
FIG. 5A is a block diagram of an exemplary synthesized netlist design with enhanced clock gating, according to an embodiment of the present invention.
Figure 6A:
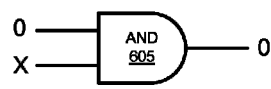
FIGS. 6A-6D depict the input and output values for various logic gates, according to an embodiment of the present invention.
Figure 6B:
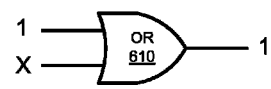
Figure 6C:
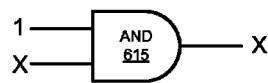
Figure 6D:
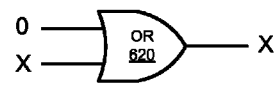

FIG. 5A is a block diagram of an exemplary synthesized netlist design 500 with enhanced clock gating, according to an embodiment of the present invention. The netlist logic 454, 456, 458, and 460 of FIG. 5A may be similar or identical to the netlist logic 454, 456, 458, and 460 of FIG. 4. Further, the register stages 410, 420, and 430 of FIG. 5A may be similar or identical to the register stages 410, 420, and 430 of FIG. 4. However, the register stages 410, 420, and 430 of FIG. 5A may include additional logic to gate individual or groups of registers in each respective register stage.

Because datapaths can perform a variety of instructions, not all flops in a retimed design may be used for all instructions. In other words, a certain flop may be used for some instructions and not for some other instructions. For example, a 16-bit integer add instruction may use only a small subset of flops and logic in a design that is also capable of performing 64-bit floating point multiplies. Accordingly, one or more flops may be unnecessary for certain functions of a datapath while necessary for other functions of the datapath. Therefore, it may be advantageous to clock gate a register for a function when that register is unnecessary for the execution of that function, thereby reducing power consumption of the design.

Embodiments of the invention provide methods and systems to analyze a retimed netlist to determine which flops are necessary or unnecessary for which instructions and insert clock gating logic into the netlist to dynamically disable unnecessary flops from operating or switching states, thereby unnecessarily consuming power. As a result, the inserted clock gating may allow necessary flops to operate while unnecessary flops are clock gated for a certain instruction. An advantage of inserting enhanced clock gating cells and logic is that power consumption of the datapath may be reduced since unnecessary flops do not operate.

For example, in an arithmetic logic unit that executes integer and floating point operations, the arithmetic logic unit may include logic for integer-based operations that uses at least some different logic from logic included for floating point-based operations. When the arithmetic logic unit executes integer-based operations, embodiments of the present invention may disable logic that is included for floating point-based operations but not for integer-based operations, and vice versa.

FIG. 5A includes an input 302 that may be similar to the inputs 302 and 402 of FIGS. 3 and 4, respectively. The input 302 may include one or more input bits, for example input bits 501-508. The input bits may include opcode bits 501-504 and operand bits 505-508. A combination of values provided by the opcode bits 501-504 may correspond to and instruct the execution of specific functions of the datapath in the netlist design 500. There may be $2^N$ possible input combinations, where N is the number of input control or opcode bits. In FIG. 5A, the four opcode bits 501-504 may be operable to provide 16 different instruction codes ($2^4$=16), but it should be appreciated that more or less opcode bits may be used which may correspond to more or less functions, respectively.

Embodiments of the invention may include gating decision logic 570 that may determine and indicate which flops to gate based on a function to be executed by the datapath. The gating decision logic 570 may be coupled with the input 302 and thereby operable to determine the values of opcode bits 501-504. The gating decision logic 570 may also be coupled with the flop stages 410, 420, and 430. Based on the opcode bits 501-504 that correspond to a certain function, the gating decision logic 570 may determine and indicate which flops in flop stages 410, 420, and 430 should be clock gated.

For example, FIGS. 5B-5C depict tables of opcodes and corresponding unnecessary registers to be clock gated, according to an embodiment of the present invention. For example referring to FIG. 5B, for a function corresponding to an opcode of '0000,' the registers 411, 413, 421, and 433 may be clock gated while the data to be processed for the function propagates through those registers' respective stages. In another example, for a function corresponding to an opcode of '0001,' no registers may be clock gated since all registers are required for the function or for other design reasons, like efficiency or area. In a further example, for a function corresponding to an opcode of '0010,' the registers 412 and 431 may be clock gated while the data to be processed for the function propagates through those registers' respective stages, however no registers in register stage 420 are clock gated.

Referring to FIG. 5C, opcodes may be grouped based on similar clock gating arrangements. For example, the functions corresponding to opcodes '0000,' '0011,' and '0101' may all share the same unnecessary registers and grouped as group A. As a result, one set of clock gating logic may be inserted into the design to clock gate for any function in group A. Multiple groups may be formed. For example, the functions corresponding to opcodes '0010' and '0111' may all share the same unnecessary registers and grouped as group B in addition to group A. As a result, a second set of clock gating logic may be inserted into the design to clock gate for any function in group B.

Returning to FIG. 5A, the gating decision logic 570 may be coupled with each flop within each flop stage in order to control whether each flop is clock gated, powered, and/or operable to change states. The gating decision logic 570 may be coupled with control circuitry that may group flops within each flop stage that are commonly unnecessary for the execution of a function or group of functions, thereby clock gating groups of flops. As a result, because one or more flops may be clock gated by the gating decision logic 570, the power consumption of the datapath in netlist design 500 may be reduced, for example, in comparison to the power consumption of the datapath in netlist design 400.

In order to determine which flops should be clock gated for a given opcode combination and/or corresponding function, the value of the opcode bits 501-504 may be forced to the values of the opcode to be analyzed. For example, opcode bits 501-504 may be set to 0, 0, 0, and 0, respectively, which corresponds to an opcode combination of '0000.' The operand bits 505-508 may be set to an unknown value X. The opcode values may be propagated to the first stage of registers 410. As a result, some registers may be forced to a value of 0 or 1, but many registers may still have an unknown value X.

For each register that had a forced value, those values may be propagated to the next stage of registers. This process of propagating the forced values of each register to the next stage may be continued until the analysis has been performed for all stages of registers.

Subsequently, for each register in the last register stage, the register may be analyzed by temporarily forcing it to an unknown value X. The unknown value X may be propagated through the design. If the unknown value X successfully propagates to an output bit in the output 390, then the analyzed register is likely necessary for the particular opcode combination. If the unknown value X does not successfully propagate to an output bit in the output 390, then the analyzed register may be unnecessary for the opcode combination. For each analyzed register in the last stage, whether that register was necessary or unnecessary may be recorded. This analysis may then be performed on the previous register stage.

For example, for each register in the register stage immediately before the register stage most recently analyzed, the register may be analyzed by temporarily forcing it to an unknown value X and propagating the unknown value X through the design.

Alternatively, instead of testing to determine whether the unknown value X at the current stage propagates to the output bits, each register may be analyzed to determine whether the unknown value X propagates to a register in the next register stage that was previously determined to be likely needed. For each analyzed register in the current stage, whether that register was necessary, unnecessary, and/or propagated to a following necessary register may be recorded. This analysis may then be performed on the previous register stage before the current register stage, and so on until all register stages have been analyzed.

The analysis discussed above may be performed for all opcode combinations. For example, the analysis may be repeated when opcode bits 501-504 are set to 0, 0, 0, and 1, respectively, then set to 0, 0, 1, 0, respectively, and so on until all opcode combinations have been analyzed. In this way, each register in every register stage that may be necessary for each opcode combination may be determined and recorded.

FIGS. 6A-6D depict the input and output values for various logic gates 605, 610, 615, and 620, according to an embodiment of the present invention. An unknown value X may or may not propagate through to the output bits, or in other words may not be observable or make an observable different at the output, depending on constant values other registers may be forced to. For example, referring to FIG. 6A, when an AND gate 605 includes two input terminals connected with a first and a second register, if the first register has a value of '0' (zero), then the value of the second register would not propagate because the output value of the AND gate 605 would be '0' regardless of the value of the second register. Similarly, referring to FIG. 6B, when an OR gate 610 includes two input terminals connected with a first and a second register, if the first register has a value of '1' (one), then the value of the second register would not propagate because the output value of the OR gate 610 would be '1' regardless of the value of the second register.

In other cases, an unknown value X may propagate. For example, referring to FIG. 6C, when an AND gate 615 includes two input terminals connected with a first and a second register, if the first register has a value of '1' (one), then the value of the second register would propagate because the output value of the AND gate 615 would depend on the value of the second register. Similarly, referring to FIG. 6D, when an OR gate 620 includes two input terminals connected with a first and a second register, if the first register has a value of '0' (zero), then the value of the second register would propagate because the output value of the OR gate 620 would depend on the value of the second register.

Returning to FIG. 5A, if a datapath includes pipelined architecture, the gating decision logic 570 may instruct the registers in each register stage based on the opcode combination propagating through each register stage. For example, if a first set of opcode bits and operand bits reach the first register stage 410, then the gating decision logic 570 may instruct certain registers in the first register stage 410 that are not necessary for the execution of the function corresponding to the first set of opcode bits to turn off. When the first set of opcode bits propagates to the second register stage 420, the gating decision logic 570 may instruct certain registers in the first register stage 410 that are not necessary for the execution of the function corresponding to the first set of opcode bits to turn off.

However, while the first set of opcode bits and operand bits have reached the second register stage 420, a second set of opcode bits and operand bits may have reached the first register stage 410. Accordingly, the gating decision logic 570 may instruct certain registers in the first register stage 410 that are not necessary for the execution of the function corresponding to the second set of opcode bits to turn off.

After each register in every register stage that may be necessary for each opcode combination is determined, an efficient configuration for gating the registers may be determined. For example, a frequency and/or probability may be determined for the amount of instruction calls involving each opcode combination. Such probabilities may be obtained by waveforms or benchmark testing. Each opcode combination may be likely to use a different amount of registers. Because the probability of each opcode may be known and the amount of registers necessary for each opcode may be known, the number of registers not being used may be weighed by the probability that the design will include a particular opcode combination.

For example, an opcode combination that yields the highest number of unnecessary registers weighted by the probability of occurrence of that opcode combination may be determined. This opcode combination may be added to a gating group list. For all opcode combinations not yet added to the gating group list, the highest yielding weighted result may be determined. If the expected savings (where the savings may be based on but not limited to the amount of unnecessary registers and/or the probability of the opcode combination) are larger than the previously expected savings, the opcode combination may be added to the gating group list. If the expected savings are smaller, further analysis may be terminated and this opcode combination may not be added to the gating group list.

In this way, a gating group list that groups opcode combinations that yield an efficient gating design may be determined. Because two or more functions of a datapath may use at least some of the same registers, including the opcode combinations corresponding to such functions to a gating group list may be preferable for efficiency gains.

A gating group list that gates the same group of registers for different opcode combinations may be more efficient than gating different groups of registers for each opcode combination because such a design may require less logic, physical area on an integrated circuit die, design complexity, and/or power consumption. Embodiments of the present invention may include no gating groups, one gating group, or more than one gating group. If there is more than one gating group, the gating groups may or may not include one or more of the same registers.

For each gating group list, clock gating logic which generates a 1 when the current control bit combination is not in the list and a 0 otherwise may be provided, or vice versa depending on the specific implementation. This logic is consumed by a series of flops and latches that may be inserted into the netlist design.

The gating decision logic 570 may be inserted into a design that has already been retimed. Alternatively, the gating decision logic 570 may be inserted into the design during the retiming process. The resulting netlist may have enhanced clock gating, which may depend on the current operation or mode the datapath is performing for any given clock cycle.

It should be appreciated that embodiments of the invention may apply to datapaths with more or less flops, flop stages, intervening netlist logic, and/or inputs than depicted in FIG. 5A. It should also be appreciated that the gating decision logic 570 may include more components than shown in FIG. 5A. For example, the gating decision logic 570 may include logic at each flop stage for controlling which flops to enable or disable.

For example, the flop stage 410 may be coupled with a flop 417 and a latch 418. The flop 417 and the latch 418 may be further coupled with a valid line 403 and a system clock line 404. In combination with the valid line 403 and system clock line 404, the gating decision logic 570 may control which registers to clock gate at each register stage 410, 420, and 430 through the flop 417 and the latch 418. For example, the gating decision logic 570 and the valid line 403 may both drive an AND gate 550. The output of the AND gate 550 may drive the flop 417 and the latch 418, which may both be clocked by the system clock line 404. The output of the flop 417 may be coupled with the flop stage 410 for clock gating unused registers.

The output of the latch 418, which may carry the value of the valid line 403, may drive the next set of flops and latches, for example a flop 427 and a latch 428. The flop 427 and the latch 428 may be configured similarly to the flop 417 and the latch 418. At the last register stage 430, a flop 437 may be driven by the value of the valid line 403 that may have propagated from the previous stage and clocked by the system clock line 404.

Accordingly, the gating decision logic 570 may clock gate one or more flops at each flop stage. Further, the gating decision logic 570 may clock gate the same group of flops for more than one opcode or function. The gating decision logic 570 may be operable to clock gate more than one group of flops with the addition of more similar circuitry.

The clock gating of flops may be disabled by including a bypass line 560. For example, the output of the AND gate 550 may drive the input of an OR gate 555 that is also driven by the bypass line 560. As a result, the bypass line 560 may control whether the gating decision logic 570 and valid line 403 may clock gate the registers.

In addition to or in place of at least a portion of the gating logic that may carry out the flop clock gating instructed by gating decision logic 570, the netlist design 500 may include multiplexers. For example, a multiplexer may be coupled with gating decision logic 570 to select which registers are clock gated and not clock gated.

Figure 7:
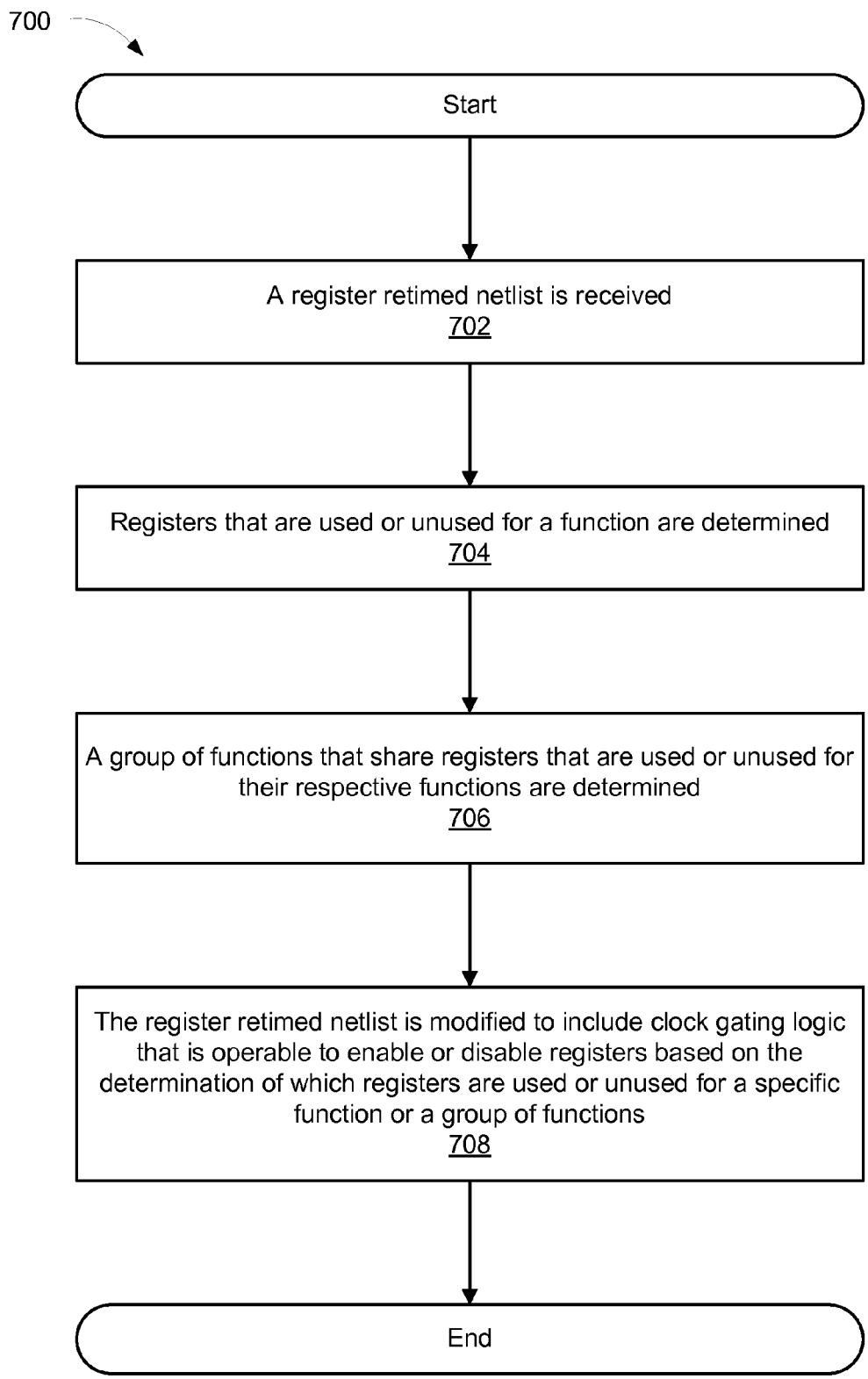
FIG. 7 depicts a flowchart of an exemplary process of enhanced clock gating of a retimed module, according to an embodiment of the present invention.

FIG. 7 depicts a flowchart 700 of an exemplary process of enhanced clock gating of a retimed module, according to an embodiment of the present invention. In a block 702, a register retimed netlist is received. For example, the netlist design 400, which may be derived from the RTL design 300 of FIG. 3, may be received. The netlist design 400 may be register retimed and include one or more stages of netlist logic and flop stages.

In a block 704, registers that are used or unused for a function are determined. For example, in FIG. 5A, registers in the register stages 410, 420, and 430 that are used or unused for functions corresponding to an opcode combination provided by the opcode bits 501-504 are determined.

In a block 706, a group of functions that share registers that are used or unused for their respective functions are determined. For example, with respect to FIG. 5A, multiple functions corresponding to opcode combinations provided by the opcode bits 501-504 may use or not use common registers. Some or all of these functions may be grouped based on but not limited to the execution frequency, execution probability, total amount of used or unused registers per function, and/or total amount of shared used or unused registers. It should be appreciated that in some embodiments of the invention, the process of block 706 may be omitted such that functions are not grouped.

In a block 708, the register retimed netlist is modified to include clock gating logic that is operable to enable or disable registers based on the determination of which registers are used or unused for a specific function or a group of functions. For example, the gating decision logic 570 of FIG. 5A may be inserted into the netlist design 400 to establish the netlist design 500. The gating decision logic 570 may enable or disable registers based on the determination of block 704 and/or block 706. As such, for a function or group of functions corresponding to an opcode combination or combinations, respectfully, the gating decision logic 570 may enable or disable registers in the register stages 410, 420, and 430.

The gating decision logic 570 may enable or disable different registers at each stage of a pipelined datapath depending on the progress of opcode combinations provided by the opcode bits 501-504 through the pipeline. For example, if a first opcode combination is at the register stage 420 and a second opcode combination is at the register stage 410, the gating decision logic 570 may enable or disable registers based on the opcode combinations at the respective register stages. The gating decision logic 570 may cause registers to be enabled or disabled by passing enable or disable instructions to components that are coupled with the gating decision logic 570 and coupled with the registers.

Figure 8:
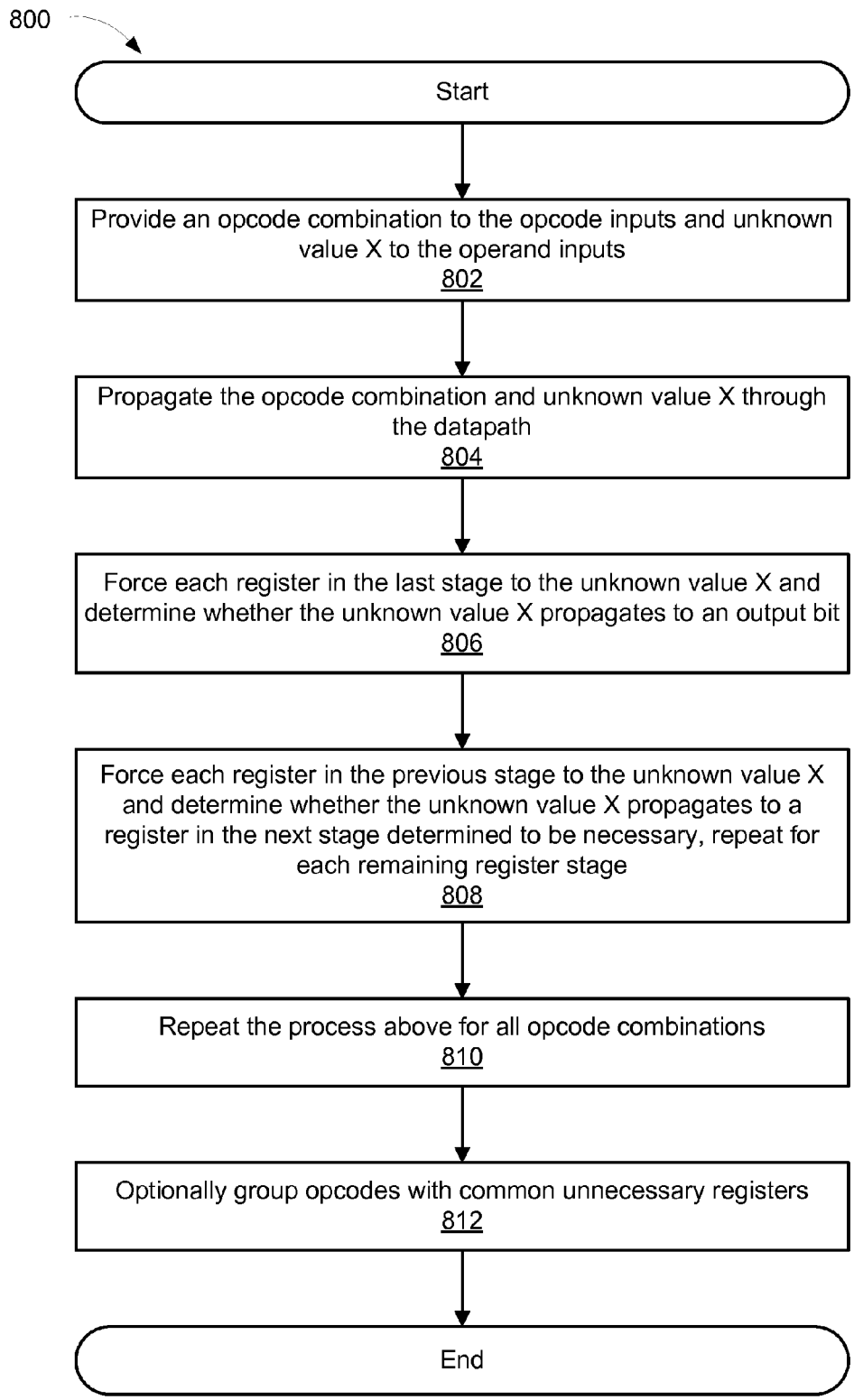
FIG. 8 depicts a flowchart of an exemplary process of determining unnecessary registers for certain functions in a design, according to an embodiment of the present invention.

FIG. 8 depicts a flowchart 800 of an exemplary process of determining unnecessary registers for certain functions in a design, according to an embodiment of the present invention. In a block 802, an opcode combination to the opcode inputs and unknown value X to the operand inputs is provided. For example, in FIG. 5A, an opcode may be provided to opcode bits 501-504 and an unknown value X to operand bits 505-508.

In a block 804, the opcode combination and unknown value X may be propagated through the datapath. For example, in FIG. 5A, through the netlist logic 454, 456, 458, 460 and the flop stages 410, 420, and 430.

In a block 806, each register in the last stage is forced to the unknown value X and whether the unknown value X propagates to an output bit is determined. For example, each register 431, 432, and 433 through to register 435 in register stage 430 is forced to the unknown value X and it is determined whether the value propagates to the output 390.

In a block 808, each register in the previous stage is forced to the unknown value X and whether the unknown value X propagates to a register in the next stage determined to be necessary is determined. For example, each register 421, 422, and 423 through to register 425 in register stage 420 is forced to the unknown value X and it is determined whether the value propagates to any registers in register stage 430 determined to be necessary in block 806. This process is repeated for each remaining register stage, for example, register stage 410.

In a block 810, the process above is repeated for all opcode combinations. As a result, the necessary and unnecessary registers for each function corresponding to an opcode combination may be determined.

In a block 812, opcodes with common unnecessary registers are optionally grouped. For example, as discussed with respect to FIG. 5C, opcodes may be grouped based on shared necessary or unnecessary registers and as a result share clock gating logic.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
using a computer system, receiving a design netlist representing a datapath operable to execute a plurality of functions corresponding to a plurality of respective opcode combinations, wherein said datapath comprises an input stage, a register stage, and an output stage, further wherein said register stage comprises a plurality of registers;
for a first function corresponding to a first opcode combination, automatically determining a subset of unused registers in said plurality of registers when said datapath performs said first function; and
automatically inserting clock gating logic into said design netlist corresponding to said subset of unused registers, wherein said clock gating logic is operable to dynamically clock gate said subset of unused registers contemporaneously when said datapath executes said first function corresponding to said first opcode combination.

2. The method of claim 1, further comprising determining a subset of unused registers in said plurality of registers for a plurality of functions each corresponding to one of a plurality of opcode combinations.

3. The method of claim 2, further comprising:
determining a clock gating group comprising a subset of said plurality of functions based on shared unused registers; and
inserting grouping clock gating logic into said design netlist, wherein said grouping clock gating logic is operable to clock gate said subset of unused registers when an opcode combination corresponding to a function in said clock gating group is executed by said datapath.

4. The method of claim 3, wherein said determining a clock gating group is based on a respective predetermined function call frequency and a number of unused registers corresponding to functions in said clock gating group.

5. The method of claim 2, wherein said design netlist further comprises a plurality of register stages and said gating logic is operable to clock gate a subset of unused registers in each register stage of said plurality of register stages.

6. The method of claim 1, wherein said determining comprises:
providing said first opcode combination and an unknown value X to said datapath;
propagating said first opcode combination and said unknown value X through said datapath; and
determining which of said plurality of registers are unused based on said propagating of said first opcode combination and said unknown value X through said datapath.

7. The method of claim 1, wherein said design netlist is a register retimed netlist.

8. A method comprising:
using a computer system, receiving input data and an opcode combination at an input stage of a datapath, wherein said opcode combination corresponds to a function and wherein said datapath comprises a plurality of register stages and an output stage, and further wherein each of said plurality of register stages comprises a plurality of registers;
automatically determining a subset of unused registers in said plurality of registers when said datapath performs said function;
clock gating said subset of unused registers in at least one of said plurality of register stages based on said opcode combination; and
providing output data at said output stage based on said input data and said opcode combination.

9. The method of claim 8, wherein said subset of unused registers are unnecessary for the execution of said function.

10. The method of claim 8, wherein said clock gating clock gates the same plurality of unused registers for more than one opcode combination.

11. The method of claim 8, wherein said clock gating clock gates a first register stage of said plurality of register stages based on a first opcode combination and clock gates a second register stage of said plurality of register stages based on a second opcode combination.

12. The method of claim 11, wherein said clock gating subsequently clock gates said second register stage of said plurality of register stages based on said first opcode combination.

13. The method of claim 8, wherein said clock gating utilizes clock gating logic coupled with said input stage and coupled with clock gating flops or latches, further wherein said clock gating flops or latches are coupled with and operable to clock gate said plurality of unused registers.

14. The method of claim 13, wherein said clock gating is operable to be disabled by providing a disable signal on a bypass line in said clock gating logic.

15. A computer system comprising:
a processor; and
memory coupled to the processor and having stored therein instructions that, if executed by the computer system, cause the computer system to execute operations comprising:
receiving a design netlist representing a datapath operable to execute a plurality of functions corresponding to a plurality of respective opcode combinations, wherein said datapath comprises an input stage, a register stage, and an output stage, further wherein said register stage comprises a plurality of registers;
for a first function corresponding to a first opcode combination, automatically determining a subset of unused registers in said plurality of registers when said datapath performs said first function; and
automatically inserting clock gating logic into said design netlist corresponding to said subset of unused registers, wherein said clock gating logic is operable to dynamically clock gate said subset of unused registers contemporaneously when said datapath executes said first function corresponding to said first opcode combination.

16. The computer system of claim 15, further comprising determining a subset of unused registers in said plurality of registers for a plurality of functions each corresponding to one of a plurality of opcode combinations.

17. The computer system of claim 16, further comprising:
determining a clock gating group comprising a subset of said plurality of functions based on shared unused registers; and
inserting grouping clock gating logic into said design netlist, wherein said grouping clock gating logic is operable to clock gate said subset of unused registers when an opcode combination corresponding to a function in said clock gating group is executed by said datapath.

18. The computer system of claim 17, wherein said determining a clock gating group is based on a respective predetermined function call frequency and a number of unused registers corresponding to functions in said clock gating group.

19. The computer system of claim 15, wherein said design netlist further comprises a plurality of register stages and said gating logic is operable to clock gate a subset of unused registers in each register stage of said plurality of register stages.

20. The computer system of claim 15, wherein said determining comprises:
providing said first opcode combination and an unknown value X to said datapath;
propagating said first opcode combination and said unknown value X through said datapath; and
determining which of said plurality of registers are unused based on said propagating of said first opcode combination and said unknown value X through said datapath.

* * * * *